United States Patent [19]

Williams

[11] Patent Number: 4,819,985
[45] Date of Patent: Apr. 11, 1989

[54] VEHICLE SUNROOF HINGE

[75] Inventor: Randy S. Williams, Livonia, Mich.

[73] Assignee: Cars & Concepts, Inc., Brighton, Mich.

[21] Appl. No.: 938,818

[22] Filed: Dec. 8, 1986

[51] Int. Cl.[4] .............................. B60J 7/11; B60J 7/19
[52] U.S. Cl. .................................. 296/218; 296/224; 16/265; 49/465
[58] Field of Search ....................... 296/216, 218, 224; 16/265; 49/465

[56] References Cited

U.S. PATENT DOCUMENTS

| 3,603,636 | 9/1971 | Carella et al. | 296/218 |
| 4,523,785 | 6/1985 | Draper et al. | 296/224 |

FOREIGN PATENT DOCUMENTS

| 172821 | 10/1982 | Japan | 296/218 |
| 172820 | 10/1982 | Japan | 296/218 |
| 175427 | 10/1982 | Japan | 296/218 |
| 180319 | 10/1983 | Japan | 296/218 |
| 177716 | 10/1983 | Japan | 296/218 |

*Primary Examiner*—Dennis H. Pedder
*Attorney, Agent, or Firm*—Brooks & Kushman

[57] ABSTRACT

A vehicle sunroof (16) is disclosed as having a detachable hinge (44) including cooperable rigid blocking members (50, 52) that prevent detachment of a sunroof panel (30) during normal use when positioned in either a closed or upper vented position. Detachment of a latch assembly (42) that connects a rear edge portion of the panel with a rear portion of a peripheral frame mounted within the roof opening (14) permits further upward movement of the rear edge portion of the panel so that the blocking members then permit the withdrawal of a pintle (46) of the hinge (44) from a hole (48) thereof so as to permit detachment of the panel (30) from the frame (18) to fully expose the roof opening (14). In the preferred construction, a pair of the detachable hinges (44) are utilized at the front extremity of the sunroof at opposite lateral sides of the latch assembly (42) at its rear extremity. Each hinge (44) includes a pair of hinge members (56, 58) on which the blocking members (50, 52) are respectively provided with one of the hinge members (56) also having a rigid stop member (54) from which the pintle (46) projects. Fasterners (60) respectively secure the hinge members (56, 58) to the front frame portion (22) and the front panel edge portion (34).

5 Claims, 2 Drawing Sheets

VEHICLE SUNROOF HINGE

TECHNICAL FIELD

This invention relates generally to a vehicle sunroof and more specifically to a hinge for permitting detachable securement of a panel of the sunroof.

BACKGROUND ART

Vehicle sunroofs have been used for many years in order to partially open the roof area for ventilation and/or for providing a more open environment for the vehicle occupants. Conventional sunroofs now currently in production normally incorporate a semi-transparent glass panel that provides a greater open appearance to the vehicle occupants even when the panel is in a closed position sealing the vehicle interior from the environment.

One type of vehicle sunroof to which this invention relates is the pop-up type as disclosed by the U.S. Pat. No. 4,541,665 of Draper et al. This pop-up type of vehicle sunroof includes a peripheral frame that is mounted within a vehicle roof opening and also includes a panel having a front edge connected by a hinge to the frame and a rear edge connected by a detachable latch assembly to the frame. Operation of the latch assembly moves the rear edge of the panel upwardly and downwardly to open and close the sunroof as the front edge pivots about the hinge. Both the hinge and the latch assembly are detachable in order to permit removal of the panel so as to thereby fully open the roof opening in which the peripheral frame is mounted. A detachable hinge of this type of sunroof has hinge portions that are resiliently deflected into and out of engagement with each other to provide the securement and detachment of the panel for its pivotal movement under control of the latch assembly.

A detachable latch assembly of the type disclosed by U.S. Pat. No. 4,523,785 of Draper et al moves the rear edge of the pop-up type of sunroof panel upwardly and downwardly between open and closed positions. This detachable latch assembly also permits removal of the panel by detachment when used with an associated detachable hinge of the type disclosed by the aforementioned U.S. Pat. No. 4,541,665 Draper et al patent.

DISCLOSURE OF INVENTION

An object of the present invention is to provide an improved vehicle sunroof of the pop-up type having a detachable hinge for attaching and detaching the sunroof panel without the necessity of applying deflection force while still insuring securement of the panel during use even when force is applied to the panel.

In carrying out the above object, a vehicle sunroof constructed in accordance with the present invention includes a peripheral frame that is mounted within an opening in a vehicle roof upon assembly. The frame has rear and front portions that extend laterally with respect to the vehicle and has laterally spaced side portions that extend between the front and rear portions to define a generally rectangular shape in the preferred construction. A panel of the sunroof opens and closes the roof opening in which the frame is received and is preferably made from semi-transparent glass so as to permit upward viewing while limiting solar penetration into the vehicle occupant compartment. The panel has rear and front edge portions respectively positionable adjacent the rear and front portions of the frame and also has laterally spaced side edge portions extending between its rear and front edge portions. A detachable latch assembly of the sunroof connects and detaches the rear edge portion of the panel and the rear portion of the frame. This latch assembly is operable to move the rear edge of the panel upwardly and downwardly between an upper vented or open position and a lower closed position. The latch assembly is also detachable to permit removal of the panel in order to fully open the roof opening to the environment.

The detachable hinge of the sunroof in accordance with this invention detachably secures the front edge portion of the panel to the front portion of the frame for movement about a pivotal axis. The construction of the hinge includes a pintle on one of the front portions and a hole in the other front portion for receiving the pintle upon lateral movement of the panel with respect to the frame with the rear edge portion of the panel raised above the vented position. The hinge also includes cooperable rigid blocking members on the frame and the front edge portion of the panel for preventing reverse lateral movement of the panel with respect to the frame and consequent withdrawal of the pintle from the hole when the rear edge portion of the panel is at the upper vented position or lower to thereby prevent unintended removal of the panel during use.

The detachable hinge and detachable latch assembly of the sunroof according to this invention thus permits movement of the panel between the upper vented position and the lower closed position without the possibility of the hinge detaching the panel. Detachment of the latch assembly permits the rear edge portion of the panel to be moved upwardly above the vented position so that the blocking members of the detachable hinge permit the lateral movement that withdraws the pintle from the hole so that the panel can be removed to fully expose the roof opening.

The hinge includes a rigid stop member that limits the lateral movement of the panel upon insertion of the panel into the hole by engaging one of the blocking members. A first end of the pintle is supported by the stop member with a second distal end of the pintle projecting axially along the pintle axis away from the stop member so as to be insertable into the hole of the hinge upon mounting of the panel on the frame. The pintle is located between the stop member and the blocking member mounted on the one front portion. As disclosed, the pintle of the hinge is mounted on the front portion of the frame and the hole is located on the front edge portion of the panel.

In the preferred construction of the sunroof, the detachable hinge includes a pair of hinge members and fasteners that respectively secure the pair of hinge members to the front portions of the frame and the front edge portion of the panel. One of the hinge members includes the stop from which the pintle projects, while the other hinge member has the hole that receives the pintle and also functions as one of the blocking members which engages the stop to limit lateral movement of the panel as the pintle is received by the hole. The one hinge member on which the stop is located also has the other blocking member mounted thereon to engage the blocking member on the other hinge member when the rear edge portion of the panel is at the upper vented position or lower to thereby provide the prevention of unintended removal of the panel during use.

As previously mentioned, the preferred construction of the sunroof has the peripheral frame provided with a generally rectangular shape and the panel likewise has a corresponding generally rectangular shape for opening and closing the roof opening in which the frame is received. The detachable latch assembly for connecting and detaching the rear edge portion of the panel and the rear portion of the frame is positioned at a central location between the lateral sides of the sunroof. A pair of the detachable hinges are utilized in this preferred construction located on opposite lateral sides of the latch assembly The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
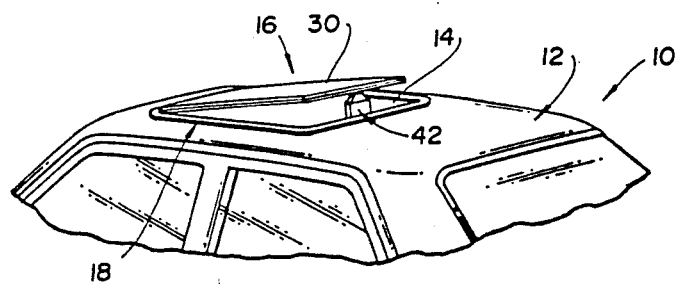
FIG. 1 is a partial perspective view of a vehicle roof incorporating a vehicle sunroof in accordance with the present invention.

With reference to FIG. 1 of the drawings, a partially shown vehicle indicated generally by 10 includes a roof 12 having an opening 14 in which a vehicle sunroof 16 according to this invention is mounted. Normally the sunroof 16 will be added to the vehicle as an optional feature which necessitates cutting the roof opening 14 and then installing the sunroof. However, it is also possible to install the sunroof 16 as an original equipment manufacturer item if such is deemed to be desirable.

Figure 2:
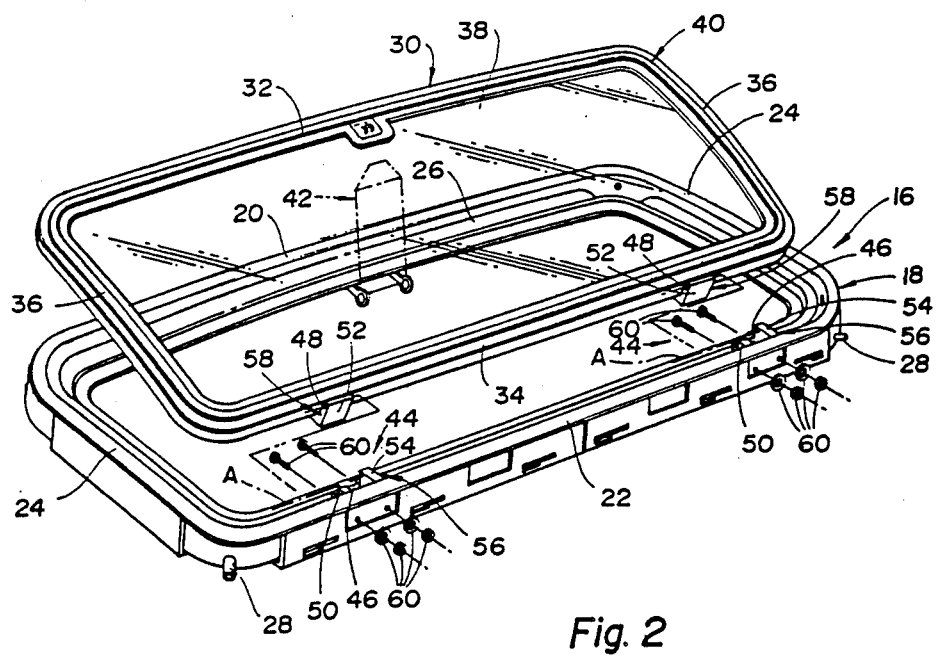
FIG. 2 is a perspective view illustrating a peripheral frame, a panel, and a detachable hinge construction of the sunroof.

With combined reference to FIGS. 1 and 2, the sunroof 16 includes a peripheral frame 18 that is mountable within the roof opening 14 upon installation. This frame 18 has rear and front portions 20 and 22 that extend laterally with respect to the vehicle and also has laterally spaced side portions 24 that extend between the rear and front frame portions. In the preferred construction illustrated, the frame 18 has a generally rectangular shape that is elongated in a lateral direction with respect to the vehicle and has rounded corners. Each of the frame portions 20, 22, and 24 is preferably stamped from a unitary piece of sheet metal in accordance with the teachings of U.S. Pat. No. 4,541,665 of Draper et al, the entire disclosure of which is hereby incorporated by reference, to define a drainage trough 26 around the entire frame. The drainage trough 26 is preferably inclined so as to drain toward the front lateral corners where outlets 28 are provided for connection through suitable conduits for flow to the ground.

As also shown by combined reference to FIGS. 1 and 2, the sunroof 16 includes a panel 30 for opening and closing the roof opening 14 in which the peripheral frame 18 is mounted. This panel 30 has rear and front edge portions 32 and 34 respectively positionable adjacent the rear and front portions 20 and 22 of the frame 18 when the panel is closed. The panel 30 also has laterally spaced side edge portions 36 extending between its rear and front edge portions and postionable adjacent the side portions 24 of the peripheral frame 18 when the panel is closed. As illustrated, the panel 30 has a generally rectangular shape that is elongated in a lateral direction like the frame 18 and is constructed from a central glass panel 38 with a peripheral reinforcing frame border 40. The glass panel 38 is preferably semi-transparent to reduce the transmission of solar energy into the vehicle while still permitting the occupant to view the sky even when the sunroof is closed or in its partially vented position illustrated in FIG. 1. The preferred construction of the reinforcing border 40 is identical to the one disclosed by the aforementioned U.S. Pat. No. 4,541,665 of Draper et al which has been hereby incorporated by reference and to which reference should be made for a more detailed understanding of the construction involved.

As illustrated in FIG. 1, a detachable latch assembly generally indicated by 42 connects and detaches the rear edge portion 32 of the panel 30 and the rear portion 20 of the peripheral frame 18. This latch assembly 42 has the same construction as the latch illustrated by U.S. Pat. No. 4,523,785 of Draper et al, the entire disclosure of which is hereby incorporated by reference. Operation of the latch assembly 42 moves the rear edge portion 32 of the panel 30 upwardly and downwardly between the upper vented position shown in FIG. 1 and a lower closed position where the edge portions of the panel are sealed with suitable unshown seals of the peripheral frame 18. In addition, the latch assembly 42 is detachable as is fully disclosed by the U.S. Pat. No. 4,523,785 Draper et al patent to permit removal of the panel 30 so that the roof opening 14 is fully exposed. Also, the latch assembly 42 is located at a central position along the rear frame portion 20 and the rear edge portion 32 of the panel 30 between the opposite lateral extremes of the sunroof 16. This central location allows the latch assembly to be conveniently operated by either the vehicle driver or the front seat passenger.

Figure 3:
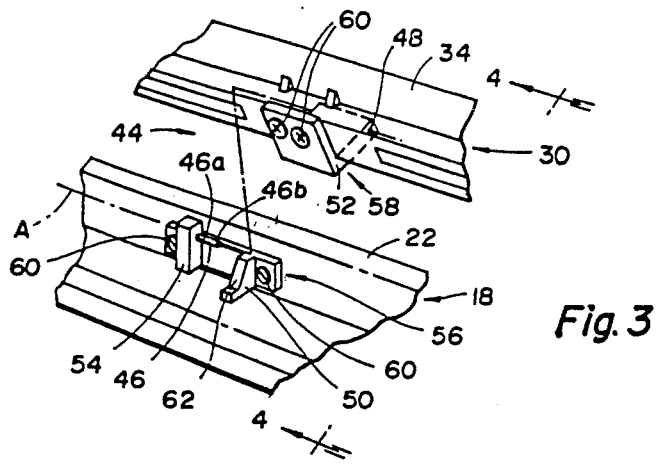
FIG. 3 is a partial perspective view that further illustrates the detachable hinge of the sunroof.

With combined reference to FIGS. 2 and 3, the vehicle sunroof 16 is disclosed as including a pair of detachable hinges 44 for detachably securing the front edge portion 34 of the panel 30 to the front portion 22 of the frame 18 for movement about a pivotal axis A. The pair of detachable hinges 44 are located on opposite lateral sides of the latch assembly 42 generally adjacent the front rounded corners of the sunroof.

As illustrated in FIG. 3, each detachable hinge 44 includes a pintle 46 on one of the front portions and also includes a hole 48 in the other front portion for receiving the pintle upon lateral movement of the panel 30 with respect to the frame 18 along the axis A. As is hereinafter more fully described, this lateral movement takes place with the rear edge portion 32 of the panel raised above the vented position illustrated in FIG. 1.

Figure 4:
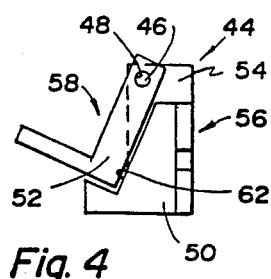
FIG. 4 is an axial view taken along the direction of line 4-4 in FIG. 3 to illustrate the orientation of the hinge during attachment and detachment of the sunroof panel to the peripheral frame.
Figure 5:
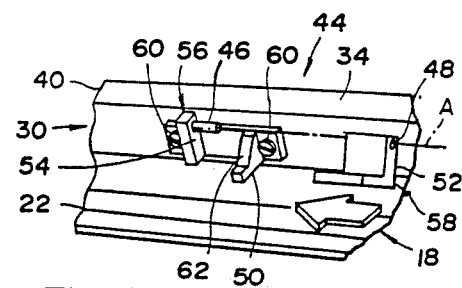
FIG. 5 is a perspective view that further illustrates the orientation of the hinge during the attachment and detachment of the sunroof panel and the peripheral frame.
Figure 6:
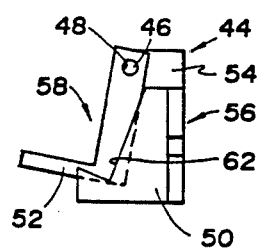
FIG. 6 is an axial view taken in the same direction as FIG. 4 but illustrating the orientation of the hinge when the sunroof panel is in its upper vented position where detachment of the hinge is prevented.
Figure 7:
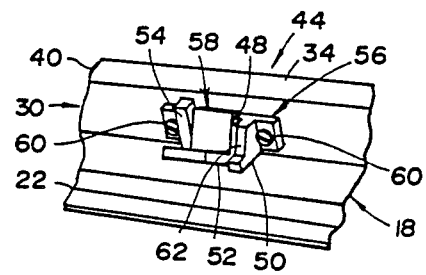
FIG. 7 is a perspective view that further illustrates the orientation of the hinge with the sunroof panel in the vented position.

With combined reference to FIGS. 3, 4, and 5, the detachable hinge 44 includes a pair of cooperable rigid blocking members 50 and 52 respectively located on the front portion 22 of the frame 18 and the front edge portion 34 of the panel 20. These blocking members 50 and 52 as best illustrated in FIG. 4 are constructed so as to permit the lateral movement that inserts the pintle 46 within the hole 48 when the rear edge portion of the panel is located above the vented position illustrated in FIG. 1. After such insertion of the pintle 46 into the hole 48 with each of the pair of hinges 44, downward movement of the rear panel edge portion 32 to the vented position corresponds to positioning of each hinge as shown in FIGS. 6 and 7 so that the blocking members 50 and 52 prevent reverse lateral movement of the panel with respect to the frame and consequent withdrawal of the pintle from the hole. Thus, the blocking members 50 and 52 prevent withdrawal of the pintle 46 from the hole 48 of each hinge when the rear edge portion 32 of the panel 30 is at the upper vented position as shown in FIG. 1 or lower such as in the closed position as shown by the hinge positioning in FIGS. 8 and 9.

Figure 8:
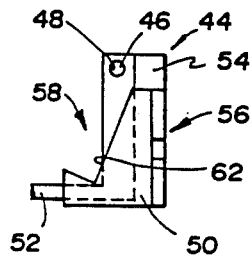
FIG. 8 is an axial view of the hinge taken in the same direction as FIG. 4 but showing the hinge orientation when the sunroof panel is in the closed position where detachment of the hinge is prevented just like in the vented position shown in FIG. 6.
Figure 9:
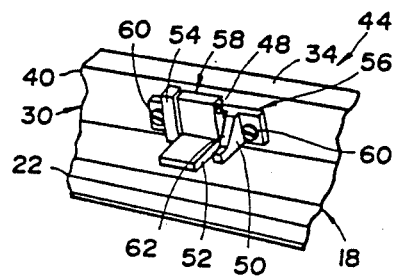
FIG. 9 is a partial perspective view that further illustrates the orientation of the hinge when the sunroof panel is in the closed position.

From the closed position where the hinges are as shown in FIGS. 8 and 9, opening of the panel to the vented position corresponding to the hinge position of FIGS. 6 and 7 maintains the hinged connection of the front panel edge 34 to the front frame portion 22 which corresponds to the normal limits of use with the panel 30 attached. Detachment of the latch assembly 42 illustrated in FIGS. 1 and 2 allows further upward movement of the rear edge portion 32 of the panel 30 so as to permit the blocking members 50 and 52 to move to the position of FIGS. 4 and 5 where reverse lateral movement of the panel is permitted so that the pintle 46 can be withdrawn from the hole 48 of the associated hinge for detachment of the panel to fully expose the roof opening of the sunroof.

In the preferred hinge construction best illustrated in FIG. 3, the hinge 44 includes a rigid stop member 54 that limits the lateral movement of the panel upon insertion of the pintle 46 into the hole 48. This stop member 54 functions by engaging the blocking member 52 which is thus positioned between the stop member and the other blocking member 50. The pintle 46 has a first end 46a supported on the stop member 54 in any suitable manner and has a second distal end 46b that projects axially along the pivotal axis A away from the stop member so as to be insertable into the hole 48 of the hinge upon mounting of the panel 30 on the frame 18. The pintle 46 is located between the stop member 54 and the blocking member 50. In the preferred construction illustrated, the pintle 46 is mounted on the front portion 22 of the frame 18 and the hole 48 is located on the front edge portion 34 of the panel 30.

As best illustrated by combined reference to FIGS. 2 and 3, each detachable hinge 44 includes a pair of hinge members 56 and 58. Fasteners 60 such as threaded bolts and nuts used with lock washers secure the pair of hinge members 56 and 58 to the front portion 22 of the frame 18 and the front edge portion 34 of the panel 30. The one hinge member 56 includes the stop member 54 from which the pintle 46 projects as previously described, while the other hinge member 58 has the hole 48 that receives the pintle and also functions as the one blocking member 52 which, as previously described, engages the stop member 54 to limit the lateral movement of the panel 30 as the pintle is received by the hole. The hinge member 56 on which the stop member 54 is mounted also has the blocking member 50 mounted thereon to engage the blocking member 52 when the rear edge portion is at the upper vented position, as illustrated by FIGS. 6 and 7, or lower as illustrated by FIGS. 8 and 9 to thereby provide the prevention of unintended detachment of the panel during use.

As illustrated in FIGS. 3 through 9, the one hinge member 58 that defines the blocking member 52 has an L-shaped configuration with a longer leg whose upper end has the hole 48 that receives the pintle 46 and a shorter leg through which the fasteners 60 are connected as shown in FIG. 3. The blocking member 50 on the other hinge member 56 has a right angle notch 62 that permits the lateral movement of the panel for insertion and withdrawal of the pintle 46 into the hole 48 when the rear edge portion of the panel is located above the vented position as previously described. After such insertion, downward movement of the rear edge portion of the panel moves the junction of the legs of blocking member 52 out of alignment with the notch 62 and into blocking engagement with the blocking member 50 so as to prevent the lateral movement of the panel for withdrawal of the pintle 46 from the hole 48. This blocking relationship between the blocking member 50 and the blocking member 52 of the two hinge members 56 and 58 is maintained throughout normal use as the panel is moved between its closed position and the vented position illustrated in FIG. 1. Detachment of the latch assembly 42 for removal of the panel 30 and upward movement of the rear edge portion of the panel above the vented position to the position illustrated in FIGS. 4 and 5 then again aligns the blocking member 52 with the notch 62 in order to permit detachment of the panel.

As is apparent from the foregoing description, the attachment and detachment of the hinges 44 is achieved without any application of force as has previously been necessary with conventional vehicle sunroofs.

While the best mode for carrying out the invention has been described in detail, those familiar with the art to which this invention relates will recognize various alternative designs and embodiments for carrying out the invention as described by the following claims.

What is claimed is:

1. A vehicle sunroof comprising:
  a peripheral frame that is mountable within an opening in a vehicle roof, the frame having rear and front portions, and the frame having laterally spaced side portions extending between the rear and front portions;
  a panel for opening and closing the roof opening in which the frame is received, the panel having rear and front edge portions respectively positionable adjacent the rear and front portions of the frame, and the panel having laterally spaced side edge portions extending between its rear and front edge portions;
  a detachable latch assembly for connecting and detaching the rear edge portion of the panel and the rear portion of the frame, the latch assembly being operable to move the rear edge of the panel upwardly and downwardly between an upper vented position and a lower closed position, and the latch assembly also being detachable to permit removal of the panel; and a detachable hinge for detachably securing the front edge portion of the panel to the front portion of the frame for movement about a pivotal axis, the hinge including a rigid stop member having a pintle on one of the front portions, the other front portion defining a hole for receiving the pintle upon lateral movement of the panel with respect to the frame with the rear edge portion of the panel raised above the vented position, the hinge also including a pair of cooperable rigid blocking members on the front portion of the frame and on the front edge portion of the panel, the rigid stop member and the rigid blocking member on the one front portion being spaced from each other with the pintle located therebetween extending from the rigid stop member thereon toward the rigid blocking member thereon, the rigid stop member being engaged by the other rigid blocking member to limit insertion of the pintle into the hole, and the rigid blocking members being engageable with each other to (a) prevent insertion of the pintle into the hole when the rear edge portion of the panel is at or lower than the vented position, (b) permit insertion of the pintle into the hole when the rear edge portion of the panel is above the vented position, and (c) prevent reverse lateral movement of the panel with respect to the frame and consequent withdrawal of the pintle from the hole when the rear edge portion of the panel is at the upper vented position or lower to thereby prevent unintended removal of the panel during use.

2. A sunroof as in claim 1 wherein the pintle of the hinge is mounted on the front portion of the frame and the hole is located on the front edge portion of the panel.

3. A sunroof as in any preceding claim wherein the hinge includes a pair of hinge members on which the stop member and pintle and the hole are respectively located, and fasteners that respectively secure the pair of hinge members to the front portion of the frame and the front edge portion of the panel.

4. A vehicle sunroof comprising:

a peripheral frame of a generally rectangular shape that is mountable within an opening in a vehicle roof, the frame having rear and front portions, and the frame having laterally spaced side portions extending between the rear and front portions;

a generally rectangular panel for opening and closing the roof opening in which the frame is received, the panel having rear and front edge portions respectively positionable adjacent the rear and front portions of the frame, and the panel having laterally spaced side edge portions extending between its rear and front edge portions;

a detachable latch assembly for connecting and detaching the rear edge portion of the panel and the rear portion of the frame at a central location, the latch assembly being operable to move the rear edge of the panel upwardly and downwardly between an upper vented position and a lower closed position, and the latch assembly also being detachable to permit removal of the panel; and a pair of detachable hinges located on opposite lateral sides of the latch assembly and operable to detachably secure the front edge portion of the panel to the front portion of the frame for movement about a pivotal axis, each hinge including a rigid stop member having a pintle on one of the front portions, the other front portion defining a hole for receiving the pintle upon lateral movement of the panel with respect to the frame with the rear edge portion of the panel raised above the vented position, each hinge also including a pair of cooperable rigid blocking members respectively mounted on the front portion of the frame and on the front edge portion of the panel, the rigid stop member and the rigid blocking member on the one front portion being spaced from each other with the pintle located therebetween extending from the rigid stop member thereon toward the rigid blocking member thereon, the rigid stop member being engaged by the other rigid blocking member to limit insertion of the pintle into the hole, and the rigid blocking members being engageable with each other to (a) prevent insertion of the pintle into the hole when the rear edge portion of the panel is at or lower than the vented position, (b) permit insertion of the pintle into the hole when the rear edge portion of the panel is above the vented position, and (c) prevent reverse lateral movement of the panel with respect to the frame and consequent withdrawal of the pintle from the hole when the rear edge portion of the panel is at the upper vented position or lower to thereby prevent unintended removal of the panel during use.

5. A vehicle sunroof comprising:

a peripheral frame of a generally rectangular shape that is mountable within an opening in a vehicle roof, the frame having rear and front portions, and the frame having laterally spaced side portions extending between the rear and front portions;

a generally rectangular panel for opening and closing the roof opening in which the frame is received, the panel having rear and front edge portions respectively positionable adjacent the rear and front portions of the frame, and the panel having laterally spaced side edge portions extending between its rear and front edge portions;

a detachable latch assembly for connecting and detaching the rear edge portion of the panel and the rear portion of the frame at a central location, the latch assembly being operable to move the rear edge of the panel upwardly and downwardly between an upper vented position and a lower closed position, and the latch assembly also being detachable to permit removal of the panel; and a pair of detachable hinges located on opposite lateral sides of the latch assembly and operable to detachably secure the front edge portion of the panel to the front portion of the frame for movement about a pivotal axis, each hinge including a pair of hinge members and fasteners that respectively secure the pair of hinge members to the front portion of the frame and the front edge portion of the panel, one of the hinge members including a rigid stop member and a pintle projecting from the rigid stop member, the other hinge member including a hole for receiving the pintle upon lateral movement of the panel with respect to the frame with the rear edge portion of the panel raised above the vented position, a pair of cooperable rigid blocking members respectively mounted on the pair of hinge members, the rigid stop member and the blocking member on the one hinge member being spaced from each other with the pintle located therebetween extending from the rigid stop member thereon toward the rigid blocking member thereon, the rigid stop member on the one hinge member engaging the rigid blocking member on the other hinge member to limit insertion of the pintle into the hole, and the rigid blocking members cooperating to (a) prevent insertion of the pintle into the hole when the rear edge portion of the panel is at or lower than the vented position, (b) permit insertion of the pintle into the hole when the rear edge portion of the panel is above the vented position, and (c) prevent reverse lateral movement of the panel with respect to the frame and consequent withdrawal of the pintle from the hole when the rear edge portion of the panel is at the upper vented position or lower to thereby prevent unintended removal of the panel during use.

* * * * *